(12) United States Patent
LoCasto et al.

(10) Patent No.: US 8,788,410 B1
(45) Date of Patent: Jul. 22, 2014

(54) SYSTEM AND METHOD FOR RISK EVALUATION IN EFT TRANSACTIONS

(75) Inventors: Charles LoCasto, Staten Island, NY (US); Balaji Rangan, Dublin, OH (US); Jamie Cerutti, Carrollton, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 182 days.

(21) Appl. No.: 12/907,253

(22) Filed: Oct. 19, 2010
(Under 37 CFR 1.47)

Related U.S. Application Data

(63) Continuation of application No. 12/474,380, filed on May 29, 2009, now abandoned.

(51) Int. Cl.
*G06Q 40/00* (2012.01)

(52) U.S. Cl.
USPC .................................. 705/39; 705/35; 705/40

(58) Field of Classification Search
USPC .............................. 705/38, 39, 40, 41, 42, 35
See application file for complete search history.

(56) References Cited

U.S. PATENT DOCUMENTS

| | | | |
|---|---|---|---|
| 7,016,872 B1 | 3/2006 | Bettis et al. | |
| 7,509,274 B2 | 3/2009 | Kam et al. | |
| 7,546,264 B2 | 6/2009 | Charnley | |
| 7,647,579 B2 | 1/2010 | Drissi et al. | |
| 7,698,196 B1 | 4/2010 | Rouvinez et al. | |
| 7,711,623 B2 | 5/2010 | Simko et al. | |
| 7,801,808 B1 | 9/2010 | Gray et al. | |
| 7,970,701 B2 * | 6/2011 | Lewis et al. | 705/38 |
| 8,346,655 B2 | 1/2013 | Tzroya | |
| 8,352,346 B2 | 1/2013 | Carpenter et al. | |
| 8,433,638 B2 | 4/2013 | Carpenter et al. | |
| 2010/0094743 A1 | 4/2010 | Bruno et al. | |
| 2011/0166983 A1 | 7/2011 | Laipply et al. | |
| 2012/0284158 A1 | 11/2012 | Kovac | |
| 2013/0085789 A1 | 4/2013 | Tzroya | |

* cited by examiner

*Primary Examiner* — Ojo Oyebisi
(74) *Attorney, Agent, or Firm* — Goodwin Procter LLP

(57) ABSTRACT

Embodiments of the invention are directed to a computer-implemented method for facilitating risk assessment for an EFT transaction. The transaction occurs between at least an originating participant and a destination participant. The method includes maintaining an alias table stored in a computer memory, the alias table containing country information for facilitating identification of a corresponding country associated with at least one EFT participant. The method additionally includes making a country identification implementing a computer processor through consultation with the alias table and execution of a matching process, the matching process incorporating the EFT data and alias table country information to identify the corresponding country. The method further includes passing the country identification to risk analysis components for evaluating risk associated with the transaction.

28 Claims, 7 Drawing Sheets

SYSTEM AND METHOD FOR RISK EVALUATION IN EFT TRANSACTIONS

This application is a continuation application of U.S. application Ser. No. 12/474,380 filed on May 29, 2009.

TECHNICAL FIELD

Embodiments of the invention are related systems and methods for evaluating money laundering risk in financial transactions and more particularly to more accurately identifying locations of the participants in the transactions.

BACKGROUND OF THE INVENTION

Traditionally, electronic funds transfers ("EFTs") are submitted to financial institutions for processing to affect the movement of funds from an originating or ordering entity to a beneficiary or destination point. In order to effectively evaluate risk in these types of transactions it is necessary to identify the parties as precisely as possible.

In operation, upon initiation of an EFT, wire transfer data is forwarded to a central hub for data collection. The EFTs contain at least some information that identities one or more parties on the sending and receiving side of each transaction. In some cases, the information can be automatically analyzed and the origin and destination countries can be easily determined. In other cases, the information may be incomplete, irregular or indistinguishable.

Today, most financial institutions globally are required to identify and report transactions of a suspicious nature to a financial intelligence unit in the respective country. Thus, a bank must perform due diligence by ascertaining identities of transacting parties and monitoring transactions for suspicious activity. Financial institutions face penalties for failing to properly file currency transaction reports (CTRs) and suspicious activity reports (SARs), including heavy fines and regulatory restrictions.

To comply with existing regulations, many financial institutions utilize the services of special software to gather information about high risk individuals and organizations. These software applications monitor bank customer transactions. Transaction monitoring can be performed for various tasks including cash deposits and withdrawals, wire transfers, credit card activity, checking, share (securities) dealing and ACH activity. However, currently existing monitoring systems often yield inaccurate results due to incomplete participant information.

A component of ant-money laundering reviews is the risk ranking of cross-border transfers according to originator/beneficiary country pairings. The risk-ranking is complicated by the fact that the ability to identify the originator/beneficiary countries involved in any given wire transfer is not always straightforward. Often, information about the identity of the originator/beneficiary is not standardized, not complete, not consistent, and not predictable. While financial institutions in the United States are required to fully provide originator and beneficiary information, financial institutions in other countries are not subject to the same rules and therefore may omit necessary information or provide the information in a coded or indecipherable format.

In currently available processes for anti-money laundering review, a country must be identified for each EFT party in order to run subsequent steps. Thus, when the country of interest cannot be identified by the financial institutions involved in the transaction, a default country entry, such as "US" is entered so as to enable continued processing. This approach presents difficulties, since the default country may not accurately reflect the risk level attached to the country that the system was unable to identify.

Furthermore, when risk is detected, institutions are required to generate alerts or SARs, as set forth above. Currently, institutions generate thousands of false positive alerts monthly. If inaccurate identifications are made, the incidence of false SARs may be high, thus increasing costs required for follow-up investigations of the identified suspicious activity.

Accordingly, a solution is needed for more efficiently and accurately identifying country pairs involved in financial transactions in order to evaluate risk of money laundering activity with greater precision. With improved country identifications, risk levels associated with each EFT transaction would be better assessed.

SUMMARY OF THE INVENTION

In one aspect of the invention, a computer-implemented method is provided for facilitating risk assessment for an EFT transaction, the transaction occurring between at least an originating participant and a destination participant. The method comprises maintaining an alias table stored in a computer memory, the alias table containing country information for facilitating identification of a corresponding country associated with at least one EFT participant. The method includes making a country identification implementing a computer processor through consultation with the alias table and execution of a matching process. The matching process incorporates the EFT data and alias table country information to identify the corresponding country. The method additionally includes passing the country identification to risk analysis components for evaluating risk associated with the transaction.

In an additional aspect of the invention, a computer-implemented method is provided for facilitating risk assessment for an EFT transaction occurring between at least an originating participant and a destination participant. The method includes receiving EFT data pertaining to the EFT transaction and determining that the EFT data for at least one of the EFT participants lacks a corresponding country identification. The method additionally includes accessing an alias table stored in a computer memory, the alias table containing country information for facilitating identification of a corresponding country associated with the at least one EFT participant and making a country identification implementing a computer processor through consultation with the alias table and execution of a matching process. The matching process incorporates the EFT data and alias table country information to identify the corresponding country. The method additionally includes passing the country identification to risk analysis components for evaluating risk associated with the transaction.

In an additional aspect of the invention, a computer-implemented system is provided for facilitating risk assessment for an EFT transaction. The transaction occurs between at least an originating participant and a destination participant and the system receives EFT data from the transaction between the participants. The system includes an alias table stored in a computer memory, the alias table containing country information for facilitating identification of a corresponding country associated with at least one participant in the EFT transaction. The system additionally includes a country identification engine implemented by a computer processor for facilitating identification of the at least one corresponding country through consultation with the alias table and execution of a matching process, the matching process incorporating EFT data and alias table country information to identify the at least one corresponding country. The country identification engine passes the country identification to risk analysis components for evaluating risk associated with the transaction.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a method and system for assessing risk in EFT transactions. The method and system operate to better identify countries so that risky country pairs to a transaction can be recognized. The method and system further enhance security in electronic funds transfer (EFT) transactions by improving identification of participants in EFT transactions.

Figure 1:
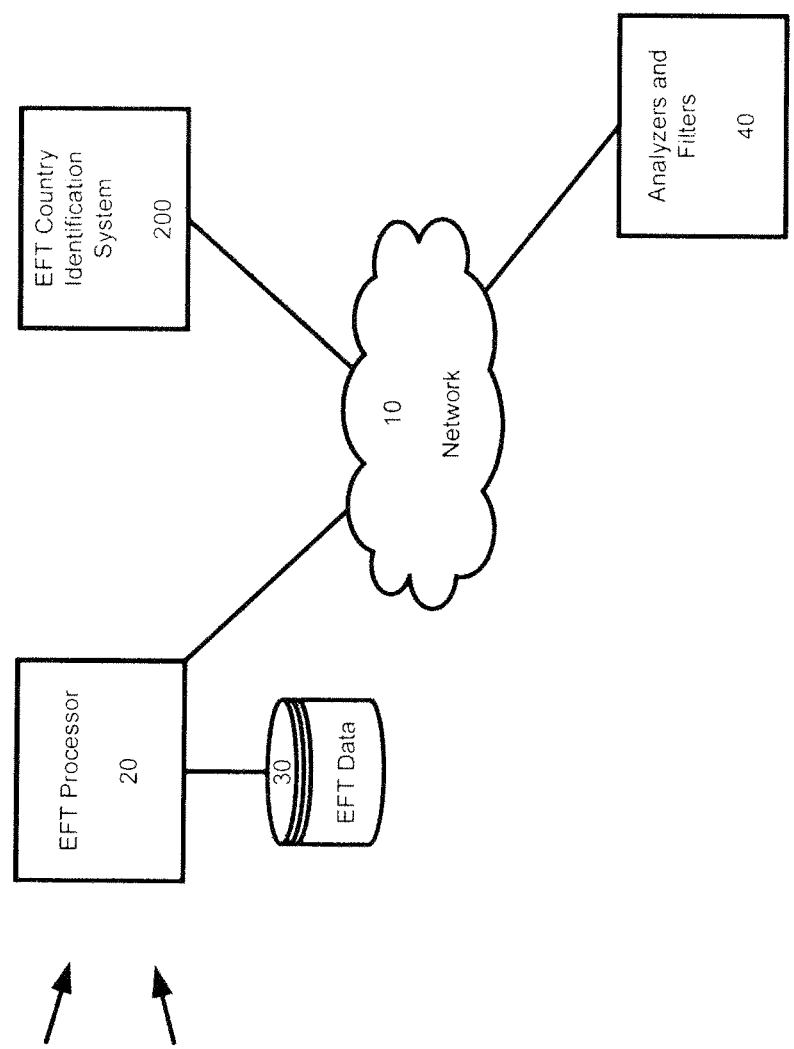
FIG. 1 is a block diagram illustrating an operating environment for an EFT risk assessment system in accordance with an embodiment of the invention.

FIG. 1 is a block diagram illustrating an operating environment for an EFT risk assessment system in accordance with an embodiment of the invention. An EFT processor 20 may access stored EFT data 30 and may be connected over a network 10 with an EFT country identification system 200 and analyzers and filters 40.

The EFT processor 20 is responsible for handling routine processing of EFT data. Based on the received data, the EFT processor 20 may be able to fully identify the parties to a transaction as well as the countries in which the parties are located. However, frequently, as set forth above, the EFT processor 20 recognizes only a portion of the received data. The EFT data store 30 may include a table for consultation in order to facilitate data processing and recognition, The EFT country identification system 200 is provided to facilitate recognition of countries of participants to an EFT transaction when the EFT data store 30 and EFT processor 20 are unable to make an appropriate determination.

The analyzers and filters 40 operate to evaluate risk upon receiving a country identification from the EFT country identification system 200 and additional information from the EFT processor 20. Thus, the analyzers and filters 40 may examine historical records to determine whether an elevated level of risk has historically been associated with the identified countries. The evaluated risk may be assigned a rank and the rank may determine whether any type of alert is required under applicable regulations.

The network 10 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
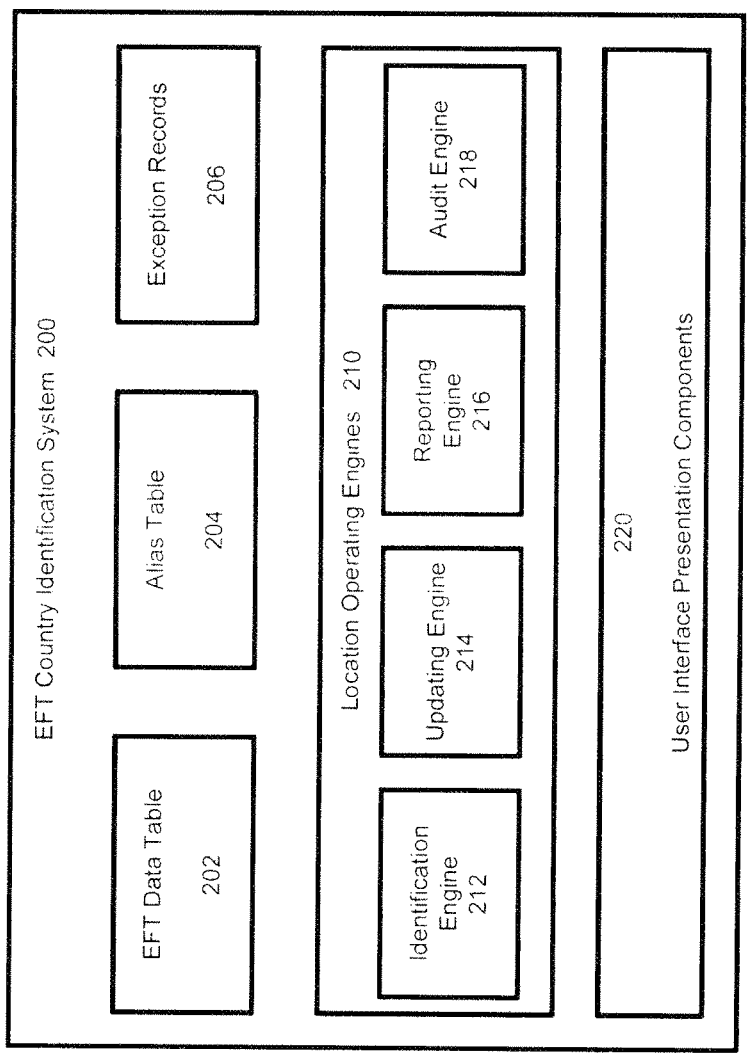
FIG. 2 is a block diagram illustrating a computer system implementing a country identification system in accordance with an embodiment of the invention.

FIG. 2 is a block diagram illustrating an EFT country identification system 200 in accordance with an embodiment of the invention. As will be further explained below, the system 200 may be implemented using one or more computing devices. The system 200 may include or access an EFT data table 202. The system 200 also includes an alias table 204 and exception records 206. Operating engines 210 may include an identification engine 212, an updating engine 214, a reporting engine 216, and an audit engine 218. User interface presentation components 220 facilitate operation of the engines 210 by allowing user viewing and manual data entry and modification.

EFT data table 202 is a transformed table that contains all of the raw wire data information including data that may have been enhanced to a degree by other related processes. The EFT data table 202 may include multiple fields for processing related to sending, receiving, and intermediary participants. These fields may include, for example, transaction ID, transaction type, transaction amount, transaction account numbers, customer type, party type, city, state, country, and postal code of participants. The transaction type may for example indicate that a transaction is a bank-to-bank transaction, a correspondent payment, a customer payment, a letter of credit, or other type of transaction that facilitates funds being transferred from one location to another. The customer type could be a direct customer or a third party customer. Party type may designates for example, originator, intermediary, beneficiary, account holder, institution, or other known types.

The alias table 204 is constructed based on existing EFT participant records. The alias table 204 holds the location or alias of each known participant to existing EFT transactions. The known participants may include intermediary or corresponding banks, the beneficiary customer who is final recipient and beneficiary institution which is in most cases the destination bank. Other participants may include the final beneficiary, which may be an individual and not a financial institution.

Each EFT transaction can be compared to the alias table 204 to validate the country assigned to the parties. These validated countries can then be leveraged in the analyzers and filters illustrated in FIG. 1 for further review for AML review purposes. As will be further described below, as EFT participants are encountered for first time, they can be reviewed and added to the alias table for future use through an exception review process or methodology implemented to derive the alias The fields on the alias table may include an update date, a participant name, a participant address, an aliased participant country, a non-aliased participant country (if identifiable) and an alias source.

For every item on the alias table 204, an indicator may be recorded and displayed with the methodology or source indicator of the aliased information. This information should be displayed as part of an alias name display. Various sources of alias table country identifiers may include matching processes such as compression and Levenshtein distance. The data may also be captured through manual override procedures or may have been part of the original record derived from existing participant data.

Preferably, the alias table 204 is constructed to be searchable on multiple fields. The fields may include for example: aliased country, date of last alias update, text search for party name, text search on any address line, search by any combination of fields, and multiple independent word strings.

The exception records 206 can be implemented to add information to the alias table 204. When new participants are encountered and the alias table does not hold a perfect match, an alias table guess may be added to the exception records 206. The guess may be made using any known methodology appropriate for use in the disclosed system. An exception review process may occur periodically by creating an exception list from the exception records 206 and reconciling the exception list with the alias table 204 in order to improve the alias table 204.

The identification engine 212 may operate in conjunction with the alias table 204 to identify countries and add data to the alias table 204 based on matching processes, manual intervention, predetermined overrides, or other factors.

The updating engine 214 may control exception processing and operate to ensure that periodic updates of the alias table 204 are made based on recently collected data. Through exception processing orchestrated by the updating engine 214, the alias table 204 and identification engine 212 function to recognize repeat patterns. Thus, with regular updates, the value of the alias table 204 increases through recursive processing. While the alias table 204 may begin with raw data, it is improved with each update.

The reporting engine 216 may be responsible for preparing reports when required. Reports may be produced relating to alias table updates. The reports may, in embodiments of the invention, be in spreadsheet format, such as for example, Microsoft Excel, or may alternatively be displayed for example in CSV or flat text format. The reporting engine may produce for example, a list of aliases by update date or by update date range. Search criteria may be implemented on the report to search to and from various dates. The full report may include fields such as update date, party name, party address, party country, alias source, and alias. The report may also include a degree of certainty or precision if available to indicate the certainty level of the alias.

An exemplary report produced by the reporting engine 216 may produce a report of aliases by country. In this instance, the report should be searchable by dates, by aliased country, and by alias technique. In embodiments of the invention, the aliased country and techniques may be selected from a drop down list.

The audit engine 218 may be provided to ensure that all additions and modifications to the alias table can be tracked by source and method. The goal of the audit trail is to keep a record of any changes to a party entry on the alias table 204. Data elements of the audit trail may include a user identifier for identifying a user who made a change, a date showing a timestamp of a change, the data element changed, the original entry prior to the update, and the updated entry or data that was entered as the change. In preferred embodiments of the invention, the audit trail is ongoing with a record of each change per data element so that prior changes are retained in the record even if those changes are no longer valid data elements. In the instance that a change is created automatically by the system, the audit engine 218 will provide an indicator of this action.

User interface presentation components 220 facilitate operation of the engines 210 through manual intervention. Furthermore, the user interface presentation components 220 facilitate viewing of the audit trail, thereby enabling users to view the record. In preferred embodiments of the invention, the Audit Trail should be accessible for every item on the alias table via a graphical user interface (GUI). Each item on the GUI should have a selectable option, such as a clickable button for viewing of the audit trail. In one embodiment of the invention, the audit trail will display in a separate screen as a pop-up window, although other designs for viewing of the audit trail are within the scope of the invention. Furthermore, the audit trail should be searchable by the following or combination of fields for search: data element, date range, User ID, text search of either original entry or updated entry, and country.

Figure 3:
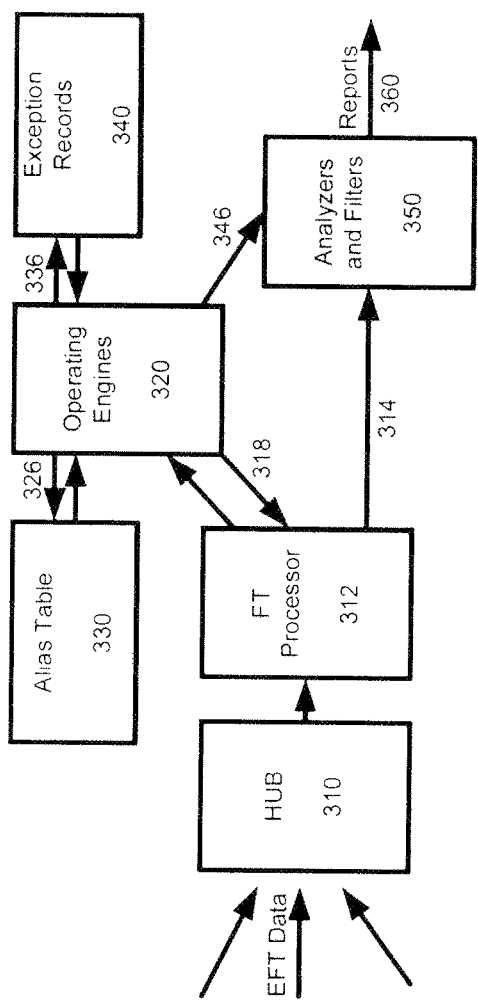
FIG. 3 is a workflow diagram illustrating flow between system components in accordance with an embodiment of the invention.

FIG. 3 is a workflow diagram illustrating flow between system components in accordance with an embodiment of the invention. EFT data 302 is transferred to a HUB 310, where the data is processed by an EFT processor 312. For country identification purposes, the EFT processor may send data at 318 to operating engines 320, which, through cooperation with the alias table 330, receive a country identification at 326. While the EFT data may include nonstandard information such as a bank name, a bank address, or an incorrect bank code, the identification engine 320 will attempt to recognize the participant through the use of the alias table. For example, the EFT data may include the country code GBT. If this country code is not a valid country code, the matching processes available through the location engine may detect the most similar country code to be GBR, which may then be inserted as a match. The lookup process may be any known process, such as pure string matching, fuzzy logic, or other existing technologies. Preferably, through the user interface presentation components described above, system users will be able to view the methodology for determining this match.

When the alias table data is applied to the EFT data, a table of party result codes may be created as shown below in Table 1. In order to accommodate the process, the standard funds transfer table is expanded to record: (a) Ordering and Beneficiary country codes; (b) which field has been determined to be the most remote bank; and (c) whether the party was aliased or identified through the funds transfer data without aliasing.

TABLE 1

| CODE | PARTY | CONDITION |
| --- | --- | --- |
| FO | Ordering Institution | FT Country Code |
| AO | Ordering Institution | Aliased Country Code |
| XO | Ordering Institution | Unmatched Exception |
| FB | Beneficiary Institution | FT Country Code |
| AB | Beneficiary Institution | Aliased Country Code |
| XB | Beneficiary Institution | Unmatched Exception |
| FA | Account With Institution | FT Country Code |
| AA | Account With Institution | Aliased Country Code |
| XA | Account With Institution | Unmatched Exception | in an embodiment of the invention, in order to apply the alias table to the funds transfer data, the operating engines select addresses from the text strings sent through the individual wire transfers by each party, including originators, beneficiaries, and intermediaries. Typically, these text strings are transmitted in multiple lines, up to five lines, although due to multiple transfers of the information and parsing and remixing by different banks, blank spaces may be interspersed on these lines and some lines may be entirely blank. The operating engines select the addresses relevant to the transaction and normalize the addresses by concatenating them into a single string. The operating engines read the string, taking out trailing spaces. Blank spaces, when encountered, can be ignored. Based on the ultimately created contiguous string, the identification engine attempts to find an alias table match. If found the alias table match is written into the FT table.

Other flows are also possible and different sequences may be implemented for ordering and beneficiary institutions. In embodiments of the invention, for the ordering institution, the system uses the ordering institution FT country code if available. Otherwise the system attempts to alias the ordering institution address. If aliasing is not completely successful, the ordering institution should be marked as an unmatched exception. A similar flow may be implemented for the beneficiary institution. The type of transaction may also be considered in determining the flow sequence. Typically, if an EFT transaction already has a country code in the most remote bank party, the system uses that country code and does not attempt to alias the record.

When the operating engines 320 obtain a country identification from the alias table 330, if the identification is not a perfect match, the operating engines 320 write the identification instance at 336 to the exception records 340. In embodiments of the invention, unmatched exceptions will be marked using a non-iso country code in the exception table, such as, for example XX or blank spaces.

At 346, the operating engines 320 send the country identifications to analyzers and filters 350 for risk analysis processing. Ultimately, the analyzers and filters 350 may issue reports 360. As a result of improved country identifications, risk levels associated with each EFT transaction can be better assessed. The system and method of the invention provide for extraction of groups of EFTs in risk based country pairs. When risk is high, suspicious activity reports or alerts may be generated. The alias table capabilities will significantly reduce the generation of false positive alerts and thus result in significant savings in the steps required for follow-up.

Figure 4:
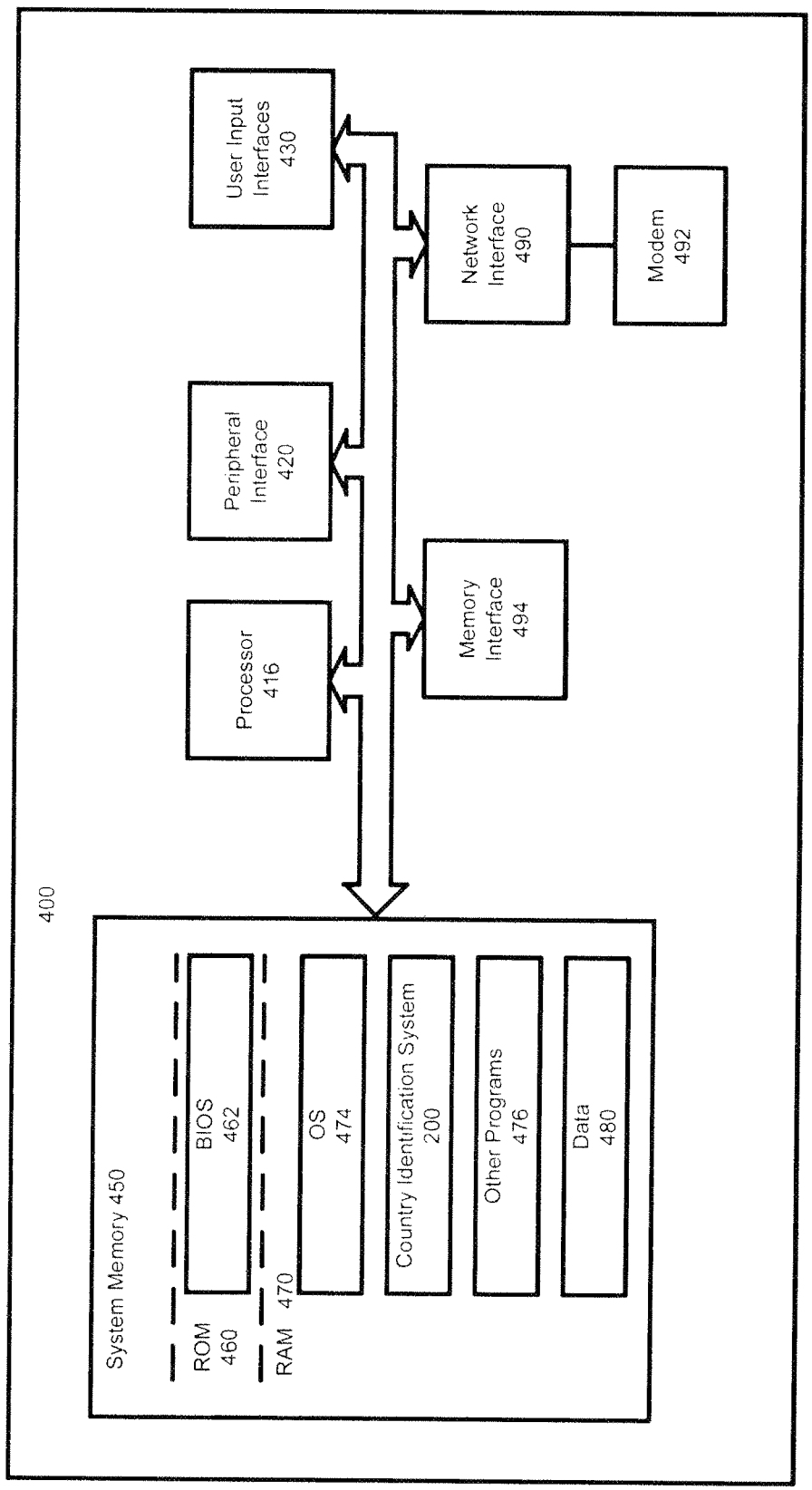
FIG. 4 is a block diagram illustrating a computing system implementing a country identification system in accordance with an embodiment of the invention.

FIG. 4 is a block diagram illustrating a computing system 400 implementing the country identification system 200 in accordance with an embodiment of the invention. This configuration is merely exemplary and should not be construed as limiting. It is likely that multiple computing systems or devices will be utilized to implement the method and system in accordance with embodiments of the invention. The computing system 400 may include a processing unit 410, a peripheral interface 420, a user input interface 430, a system bus 440, a system memory 450, a network interface 490, a connected modem 492, and a memory interface 494. The system bus 440 may be provided for coupling the various system components. In embodiments of the invention, certain components, such as modem 492, need not be included.

Computers typically include a variety of computer readable media that can form part of the system memory and be read by the processing unit. By way of example, and not limitation, computer readable media may comprise computer storage media and communication media. The system memory 450 may include computer storage media in the form of volatile and/or nonvolatile memory such as read only memory (ROM) 460 and random access memory (RAM) 470.

A basic input/output system (BIOS) 462, containing the basic routines that help to transfer information between elements, such as during start-up, is typically stored in ROM 460. RAM 470 typically contains data and/or program modules that are immediately accessible to and/or presently being operated on by processing unit. The data or program modules may include an operating system 474, country identification system 200, other program modules 476, and program data 480. The operating system may be or include a variety of operating systems such as Microsoft Windows operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 450 includes at least one set of instructions that is either permanently or temporarily stored. The processor 410 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The country identification system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, API, Basic, C, C++, COBOL, dBase, Forth, FORTRAN, Java, Modula-2, Pascal, Prolog, REXX, and/or JavaScript for example. In embodiments of the invention. Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 410 that executes commands and instructions may be a general purpose computer, but may utilize any of a wide variety of other technologies including a special purpose computer, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array). PLD (Programmable Logic Device). PLA (Programmable Logic Array). RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 430 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 420. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 5:
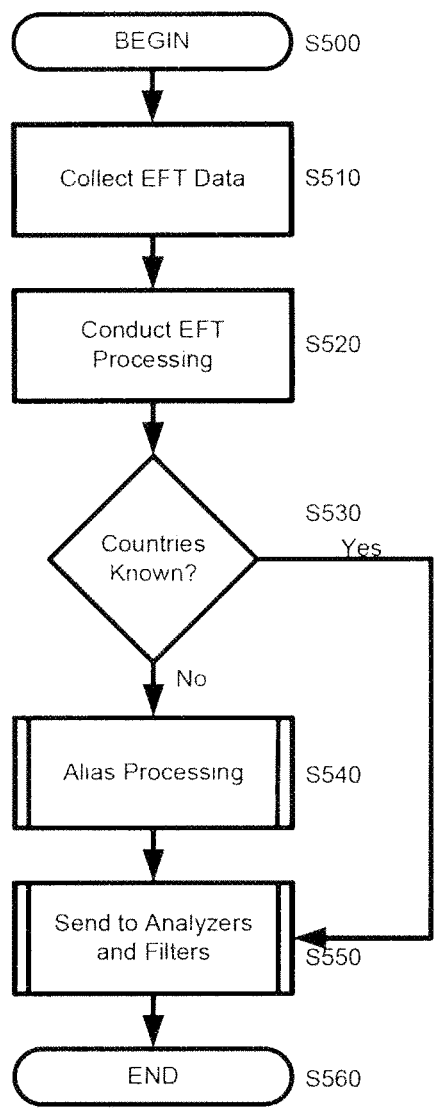
FIG. 5 is a flow chart illustrating a method for risk assessment in an EFT transaction in accordance with an embodiment of the invention.
Figure 6:
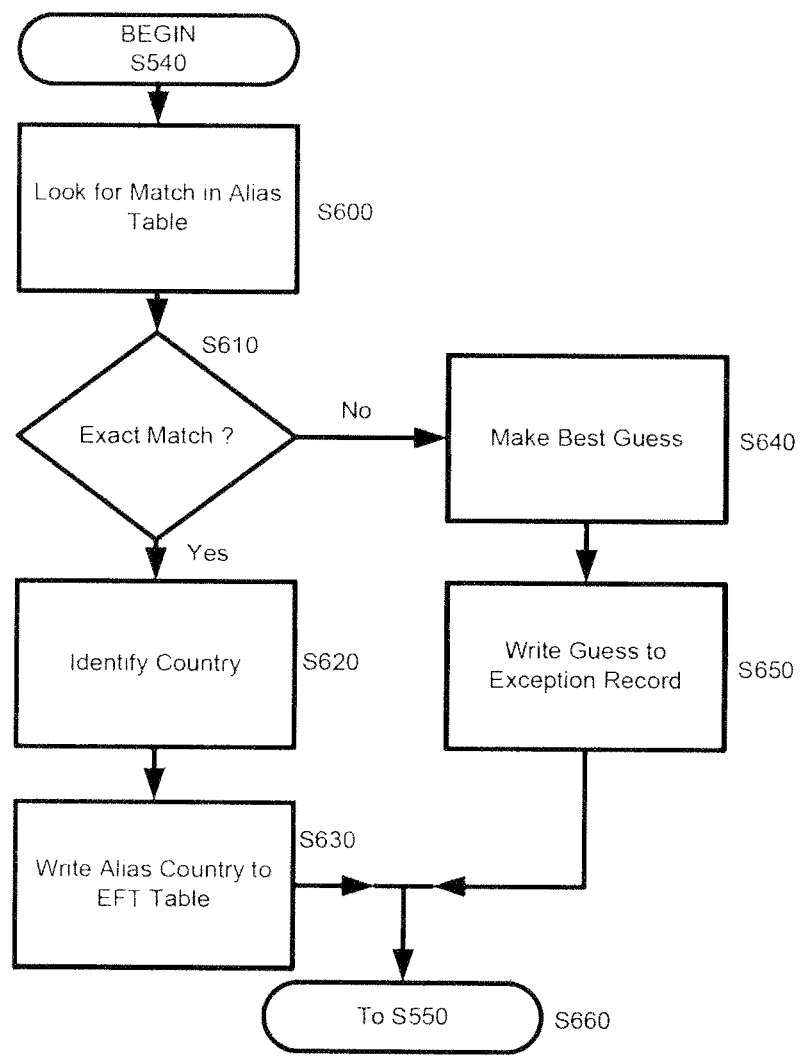
FIG. 6 is a flow chart illustrating a method for identifying countries corresponding to EFT participants in accordance with an embodiment of the invention.
Figure 7:
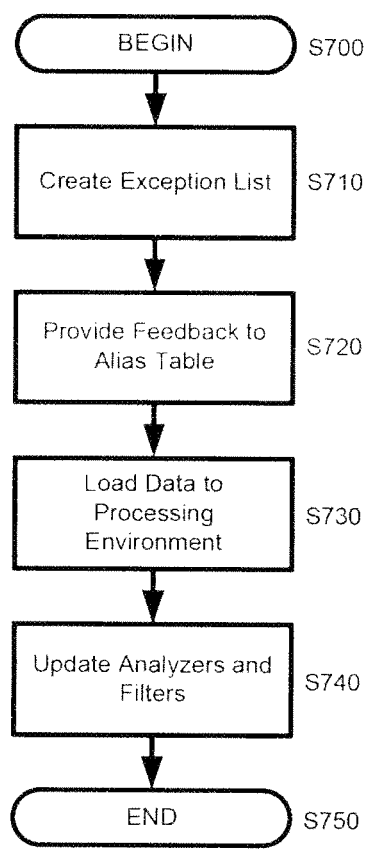
FIG. 7 is a flow chart illustrating periodic processing steps for the risk assessment method in accordance with an embodiment of the invention.

FIGS. 5-7 are flow charts illustrating methods in accordance with embodiments of the invention. Overall, the method facilitates risk evaluation by increasing accuracy of identification of countries corresponding to EFT participants. Through the use of the alias table, which retains and records historically learned knowledge about the country associated with the origination or destination of each participant, reliability of identification increases over time. Furthermore, through the use of the matching processes described above, new participants who have not been previously identified may be correctly assigned to a country.

Thus, through analysis of each electronic fund transfer by comparison with recorded knowledge, the system determines the most likely country associated with an originator or destination entity participating in an electronic fund transfer. Ultimately, through the use of analyzers and filters, risk based country pairs can be identified and assigned a risk rank. Also, particularly important to risk evaluation is the identification of the most remote bank in a nested bank electronic fund transfer and the system provides the tools to accomplish this objective.

FIG. 5 is a flow chart illustrating a method for risk assessment in an EFT transaction in accordance with an embodiment of the invention. The method begins in S500 and the system collects EFT data in S510. In S520, EFT processing components process the incoming data. In S530, the EFT processing components may determine whether corresponding countries for the EFT participants are known by applying funds transfer processing for decomposing the raw wire data into a fund transfer table in order to discover a country associated with each participant.

If the countries are known in S530, the EFT processing components may send the data to analyzers and filters for risk analysis in S550. If the countries of the EFT participants are not known in S530, the system may send the data to alias processing executed by the alias table and the location identification engine in S540 for country identification.

Accordingly, the presently proposed system improves country identification in EFT transactions. More specifically, during processing, the alias table functions to enable identification of participating countries. Thus, when country information is absent, incomplete, irregular or indistinguishable, the system consults the alias table.

After alias processing is complete, the country identifications are sent to the analyzers and filters and risk analysis is conducted in S550. During risk analysis, the analyzers and filters evaluate a level of risk. This may be accomplished, for example, by grouping together transactions between identical country pairs. The risk level is thoroughly evaluated before any SARs are generated. The process ends in S560.

FIG. 6 is a flow chart illustrating an alias processing method in accordance with an embodiment of the invention. Specifically. FIG. 6 provides further details of the alias processing of S540 shown in FIG. 5. In S600, the system looks for a country match in the alias table. If an exact match is found in S610, the country is identified in S620 and the system writes the country to the FT table in S630.

Alternatively, if in S610, no exact match is found, the system uses a matching process to make a guess as to the matching country in S640. As described above, the matching process may include procedures such as compression and Levenshtein distance. The data may also be captured through manual override procedures. In S650, the system writes the guess to the exception record. The alias process ends and control is returned to S550 of FIG. 5 in S660. Thus, if the alias table is unable to identify a country, the alias table will retain its best educated guess, but will also write an exception record for review before the next processing cycle. Thus, upon review of exception records, improved country identification may be achieved. Through a recursive process, the country identifications achieved by the alias table improve over time. Accordingly, implementation of the alias table provides a vehicle for evaluating EFT transactions by facilitating a comparison with recorded knowledge to determine the most likely country associated with an originator or destination entity. The alias table further provides for retaining and recording historically learned knowledge about the country associated with the origination or destination of an entity participating in an EFT.

FIG. 7 is a flow chart illustrating periodic processing steps for the risk assessment method in accordance with an embodiment of the invention. In order to improve the system over time, period processing steps may be conducted to improve the alias table and ultimate risk analysis accuracy. Although these processing steps are illustrated as occurring consecutively in a particular order, the steps may be performed concurrently in some instances as well as in a different sequence entirely. The steps are conducted periodically, with the period being for example, monthly, daily, weekly, or another time frame. Alternatively, the processing steps may be triggered by the occurrence of an event, such that the period for performing the steps varies over time.

In S700, the periodic processing begins and in S710, the system creates an exception list. The exception list assembles the collected exception records. Creation of the exception list involves creation of a consolidated list of records that could neither be aliased nor had a valid EFT country code available. The consolidated list will accumulate the number of EFTs and the total value of EFTs for each distinct party. The consolidated list can be sorted on any parameter.

In S720, the exception list provides feedback to the alias table. Thus, the alias table, knowing which country identifications were guesses, and how those guesses were made, will be able to determine from the exception list, if a guess has had a degree of success required to become a certain identification.

Reconciling the exception list and the alias table may be facilitated by the updating engine and/or by manual intervention. Preferably, exception records can be searched at least by address and country, thereby allowing users to update single, multiple, or batched records. Users may further update country codes and bank codes. When changes are manually made, the system may record a user identifier and timestamp on updates.

Additionally, country codes may periodically be cleaned. For example, country codes may be added for newly identified countries and invalid country codes may be deleted. A placeholder code may be implemented for exceptions or unresolved items. Furthermore, in addition to exception records, other relevant information gathered by analyzers, filters, or other components may be incorporated to update the alias table.

In S730, the updated information is entered into the processing environment. In S740, the analyzers and filters are updated, and the process ends in S750. In order to load the period data to the analyzers and filters, recent data, for example two months of data is archived and the current month's data is added.

Additionally, the analyzers and filters are preferably realigned to use the alias enhanced data. The existing analyzer may be modified to read the new aliased country columns for both originator and beneficiary.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented method for facilitating risk assessment for an EFT transaction, the transaction associated with EFT data and occurring between at least an originating participant and a destination participant, the method comprising:

maintaining an alias table stored in a computer memory, the alias table containing country information for facilitating identification of a corresponding country associated with at least one EFT participant when the EFT data does not identify the corresponding country;

receiving the EFT data for the transaction, the EFT data failing to identify the corresponding country for at least one of the originating participant and the destination participant;

making a country identification implementing a computer processor through consultation with the alias table and execution of a matching process, the matching process incorporating the EFT data and alias table country information to identify the corresponding country; and passing the country identification to risk analysis components for evaluating risk associated with the transaction based at least in part on the corresponding country.

2. The method of claim 1, wherein making a country identification comprises selecting a best match when an exact match is not found.

3. The method of claim 2, further comprising writing the best match to an exception record.

4. The method of claim 3, further comprising periodically updating the alias table based on the exception record and feedback from system processing components.

5. The method of claim 4, further comprising providing a user interface for allowing a system user to view an audit trail of the alias table.

6. The method of claim 5, wherein the audit trail provides a viewable window for each record in the alias table.

7. The method of claim 4, further comprising recording each updated record in the alias table with an indication of data element for update, an original entry, an updated entry, and an update date.

8. The method of claim 1, further comprising recording in each record of the alias table, an aliasing technique for indicating a method for selecting the aliased information.

9. The method of claim 8, wherein the aliasing technique for selecting the aliased information comprises one of compression, Levenshtein distance, manual override, and original record.

10. The method of claim 1, further comprising providing reporting functionality for listing aliases by country, wherein the reporting functionality allows searching based on date, country, and aliased technique.

11. A computer-implemented method for facilitating risk assessment for an EFT transaction, the transaction occurring between at least an originating participant and a destination participant, the method comprising:
receiving EFT data pertaining to the EFT transaction;
determining that the EFT data for at least one of the EFT participants lacks a corresponding country identification;
accessing an alias table stored in a computer memory, the alias table containing country information for facilitating identification of a corresponding country associated with the at least one EFT participant;
making a country identification implementing a computer processor through consultation with the alias table and execution of a matching process, the matching process incorporating the EFT data and alias table country information to identify the corresponding country; and
passing the country identification to risk analysis components for evaluating risk associated with the transaction based at least in part on the corresponding country.

12. The method of claim 11, wherein making a country identification comprises selecting a best match when an exact match is not found.

13. The method of claim 12, further comprising writing the best match to an exception record.

14. The method of claim 13, further comprising periodically updating the alias table based on the exception record and feedback from system processing components.

15. The method of claim 14, further comprising providing a user interface for allowing a system user to view an audit trail of the alias table.

16. The method of claim 15, wherein the audit trail provides a viewable window for each record in the alias table.

17. The method of claim 14, further comprising recording each updated record in the alias table with an indication of data element for update, an original entry, an updated entry, and an update date.

18. The method of claim 11, further comprising recording in each record of the alias table, an aliasing technique for indicating a method for selecting the aliased information.

19. The method of claim 18, wherein the aliasing technique for selecting the aliased information comprises one of compression, Levenshtein distance, manual override, and original record.

20. The method of claim 11, further comprising providing reporting functionality for listing aliases by country, wherein the reporting functionality allows searching based on date, country, and aliased technique.

21. A computer-implemented system for facilitating risk assessment for an EFT transaction, the transaction occurring between at least an originating participant and a destination participant, the system extracting EFT data from the transaction between the participants, the system comprising:
an alias table stored in a computer memory, the alias table containing country information for facilitating identification of a corresponding country associated with at least one participant in the EFT transaction when the EFT data does not identify the country;
an electronic funds transfer processor, the electronic funds transfer processor attempting to recognize each corresponding country based on received EFT data; and
a country identification engine implemented by a computer processor for facilitating identification of each country not recognized by the EFT processor by performing steps including;
accessing the alias table and executing a matching process, the matching process incorporating the EFT data and alias table country information to identify the at least one corresponding country, and
passing the country identification to risk analysis components for evaluating risk associated with the transaction based at least in part on the corresponding country.

22. The system of claim 21, further comprising an exception record for recording a best match when the country identification engine fails to find a perfect match in the alias table.

23. The system of claim 22, further comprising an updating engine for periodically updating the alias table based on the exception record and feedback from the risk analysis components.

24. The system of claim 23, further comprising a reporting engine for providing reports based on updates made by the updating engine.

25. The system of claim 23, further comprising an audit engine for providing an audit trail based on updates made by the updating engine.

26. The system of claim 25, further comprising user interface presentation components for displaying a window for viewing of the audit trail.

27. The system of claim 21, further comprising risk analysis components for receiving country identifications from the alias table and country identification engine and making a risk evaluation based on the country identifications.

28. A computer-implemented system for facilitating risk assessment for an EFT transaction, the transaction occurring between at least an originating participant and a destination participant, the system extracting EFT data from the transaction between the participants, the system comprising:
an alias table stored in a computer memory, the alias table containing country information for facilitating identification of a corresponding country associated with at least one participant in the EFT transaction when the EFT data does not identify the country;
a country identification engine implemented by a computer processor for facilitating identification of the at least one corresponding country through consultation with the alias table and execution of a matching process, the matching process incorporating EFT data and alias table country information to identify the at least one corresponding country, the country identification engine passing the country identification to risk analysis components for evaluating risk associated with the transaction based at least in part on the corresponding country;
an exception record for recording a best match when the country identification engine fails to find a perfect match in the alias table;
an updating engine for periodically updating the alias table based on the exception record and feedback from the risk analysis components;
a reporting engine for providing reports based on updates made by the updating engine;
an audit engine for providing an audit trail based on updates made by the updating engine; and
user interface presentation components for displaying a window for viewing of the audit trail.

* * * * *